US010665919B2

(12) United States Patent
Droste et al.

(10) Patent No.: US 10,665,919 B2
(45) Date of Patent: May 26, 2020

(54) ANTENNA PANE

(71) Applicant: SAINT-GOBAIN GLASS FRANCE, Courbevoie (FR)

(72) Inventors: Stefan Droste, Herzogenrath (DE); Bernd Stelling, Bielefeld (DE); Guillaume Francois, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 190 days.

(21) Appl. No.: 15/555,069

(22) PCT Filed: Mar. 30, 2016

(86) PCT No.: PCT/EP2016/056975
§ 371 (c)(1),
(2) Date: Aug. 31, 2017

(87) PCT Pub. No.: WO2016/162252
PCT Pub. Date: Oct. 13, 2016

(65) Prior Publication Data
US 2018/0037007 A1 Feb. 8, 2018

(30) Foreign Application Priority Data
Apr. 8, 2015 (EP) .................... 15162764

(51) Int. Cl.
H01Q 1/32 (2006.01)
H01Q 1/12 (2006.01)
(Continued)

(52) U.S. Cl.
CPC ..... *H01Q 1/1271* (2013.01); *B32B 17/10036* (2013.01); *B32B 17/10183* (2013.01);
(Continued)

(58) Field of Classification Search
CPC .. H01Q 1/1271; H01Q 1/3291; H01Q 9/0428; B32B 17/10183; B32B 17/10293; B32B 17/10036
See application file for complete search history.

(56) References Cited

U.S. PATENT DOCUMENTS 3,459,879 A    8/1969   Gerpheide
5,363,114 A    11/1994   Shoemaker
(Continued)

FOREIGN PATENT DOCUMENTS

CN    1518782 A    4/2004
CN    1778017 A    5/2006
(Continued)

OTHER PUBLICATIONS

J. Hautcoeur, Hautcoeur et al. "Radiofrequency Performance of Transparent Ultra-Wideband Antennas", Process in Electromagnetics Research C, vol. 22, 259-271, 2011 (Year: 2011).*
(Continued)

*Primary Examiner* — Dieu Hien T Duong
(74) *Attorney, Agent, or Firm* — Pillsbury Winthrop Shaw Pittman LLP

(57) ABSTRACT

An antenna pane is presented. The antenna pane has features that include an inner pane having an internal surface, an antenna structure made of an electrically conductive paste that is printed and fired into the internal surface of the inner pane, and a dielectric carrier element that is connected to the internal surface of the inner pane via an external surface of the dielectric carrier element. In one aspect, an internal surface of the dielectric carrier element has an electrically conductive base plate that is arranged in a region of an orthogonal projection of the antenna structure relative to the inner panel.

34 Claims, 10 Drawing Sheets

(51) Int. Cl.
*H01Q 9/04* (2006.01)
*B32B 17/10* (2006.01)

(52) U.S. Cl.
CPC ..... *B32B 17/10293* (2013.01); *H01Q 1/3291* (2013.01); *H01Q 9/0428* (2013.01)

(56) References Cited

U.S. PATENT DOCUMENTS

| | | |
|---|---|---|
| 5,670,966 A | 9/1997 | Dishart et al. |
| 5,760,744 A | 6/1998 | Sauer |
| 5,867,238 A | 2/1999 | Miller et al. |
| 6,025,806 A | 2/2000 | Deininger et al. |
| 6,118,410 A | 9/2000 | Nagy |
| 6,285,326 B1 | 9/2001 | Diximus |
| 6,313,796 B1 | 11/2001 | Potin et al. |
| 6,320,276 B1 | 11/2001 | Sauer |
| 6,322,881 B1 | 11/2001 | Boire et al. |
| 6,791,496 B1 | 9/2004 | Killen et al. |
| 6,809,692 B2 | 10/2004 | Puente Baliarda |
| 7,388,548 B2 | 6/2008 | Maeuser et al. |
| 7,545,333 B2 | 6/2009 | Li et al. |
| 7,903,042 B2 | 3/2011 | Urban et al. |
| 9,171,658 B2 | 10/2015 | Reul et al. |
| 2002/0045037 A1 | 4/2002 | Boire et al. |
| 2003/0112190 A1 | 6/2003 | Puente Baliarda et al. |
| 2004/0178961 A1 | 9/2004 | Maeuser et al. |
| 2004/0200812 A1 | 10/2004 | Grewell et al. |
| 2004/0200821 A1 | 10/2004 | Voeltzel |
| 2006/0032926 A1* | 2/2006 | Baba ............... G06K 19/07749 235/492 |
| 2006/0109178 A1 | 5/2006 | Takeuchi et al. |
| 2006/0139223 A1 | 6/2006 | Li et al. |
| 2006/0202898 A1 | 11/2006 | Li et al. |
| 2006/0273966 A1 | 12/2006 | Maeuser |
| 2007/0045264 A1 | 3/2007 | Nekoda et al. |
| 2007/0216589 A1 | 9/2007 | Li et al. |
| 2007/0285323 A1* | 12/2007 | Funatsu ............... H01Q 1/1271 343/713 |
| 2010/0141539 A1 | 6/2010 | Thole et al. |
| 2011/0221652 A1 | 9/2011 | Li et al. |
| 2011/0230146 A1 | 9/2011 | Morishita et al. |
| 2011/0233182 A1 | 9/2011 | Baranski |
| 2011/0248900 A1 | 10/2011 | De Rochemont et al. |
| 2011/0279335 A1 | 11/2011 | Degen et al. |
| 2012/0162047 A1 | 6/2012 | Mizuno et al. |
| 2013/0050983 A1 | 2/2013 | Labrot et al. |
| 2013/0099981 A1 | 4/2013 | Vortmeier et al. |
| 2013/0141289 A1 | 6/2013 | Vortmeier et al. |
| 2014/0060921 A1 | 3/2014 | Reul et al. |
| 2014/0176374 A1 | 6/2014 | Lo |
| 2015/0232067 A1 | 8/2015 | Schall et al. |
| 2017/0317399 A1 | 11/2017 | Droste et al. |
| 2018/0037006 A1 | 2/2018 | Droste et al. |

FOREIGN PATENT DOCUMENTS

| | | |
|---|---|---|
| CN | 1946644 A | 4/2007 |
| CN | 101223711 A | 7/2008 |
| CN | 102246590 A | 11/2011 |
| CN | 103228438 A | 7/2013 |
| DE | 3834075 A1 | 4/1989 |
| DE | 19536131 C1 | 1/1997 |
| DE | 19605999 A1 | 8/1997 |
| DE | 19735395 A1 | 2/1998 |
| DE | 19858227 C1 | 6/2000 |
| DE | 19832228 C2 | 5/2002 |
| DE | 10106125 A1 | 8/2002 |
| DE | 20210286 U1 | 12/2002 |
| DE | 10301352 B3 | 7/2004 |
| DE | 10319606 A1 | 11/2004 |
| DE | 202004001446 U1 | 3/2005 |
| DE | 10351488 A1 | 6/2005 |
| DE | 102004056866 A1 | 1/2006 |
| DE | 202004019286 U1 | 4/2006 |
| DE | 202006011919 U1 | 10/2006 |
| DE | 102008018147 A1 | 10/2009 |
| DE | 102008029986 A1 | 1/2010 |
| DE | 202008017611 U1 | 4/2010 |
| DE | 202010011837 U1 | 5/2011 |
| DE | 102012008033 A1 | 11/2012 |
| EP | 0608180 A1 | 7/1994 |
| EP | 0720249 A2 | 7/1996 |
| EP | 0847965 B1 | 6/1998 |
| EP | 1624527 A1 | 2/2006 |
| EP | 1898675 A2 | 3/2008 |
| EP | 2400591 A1 | 12/2011 |
| FR | 2913141 A3 | 8/2008 |
| JP | H06256044 A | 9/1994 |
| JP | H09502073 A | 2/1997 |
| JP | 2006121536 A | 5/2006 |
| JP | 2006522565 A | 9/2006 |
| JP | 2007251936 A | 9/2007 |
| JP | 2013522962 A | 6/2013 |
| WO | 00/22695 A1 | 4/2000 |
| WO | 2009/015975 A1 | 2/2009 |
| WO | 2009/099427 A1 | 8/2009 |
| WO | 2010/081589 A1 | 7/2010 |
| WO | 2011/144680 A1 | 11/2011 |
| WO | 2012/052315 A1 | 4/2012 |
| WO | 2012/136411 A1 | 10/2012 |
| WO | 2016/096432 A1 | 6/2016 |
| WO | 2016/162251 A1 | 10/2016 |
| WO | 2016162252 A1 | 10/2016 |

OTHER PUBLICATIONS

PCT Written Opinion for PCT/EP2016/056975 filed Mar. 30, 2016 in the name of Saint-Gobain Glass France, dated Jun. 13, 2016. 12 pages. (English + German).
PCT Written Opinion for PCT/EP2016/056974 filed Mar. 30, 2016 in the name of Saint-Gobain Glass France, dated Jun. 3, 2016. 12 pages. (English +German).
International Search Report issued for International Application No. PCT/EP2016/056974, filed Mar. 30, 2016 on behalf of Saint-Gobain Glass France, dated Jun. 3, 2016. 7 pages (German Original + English Translation).
International Search Report issued for International Application No. PCT/EP2016/056975, filed Mar. 30, 2016 on behalf of Saint-Gobain Glass France, dated Jun. 13, 2016. 7 pages (German Original + English Translation).
Canadian Office Action for Canadian Application No. 2,979,601 filed Sep. 13, 2017 on behalf of Saint-Gobain Glass France, dated Jul. 19, 2018. 4 pages.
Canadian Office Action for Canadian Application No. 2,979,604 filed on Sep. 13, 2017 on behalf of Saint-Gobain Glass France, dated Jul. 16, 2018 3 pages.
Chinese Office Action for Chinese Application No. 201580017710.8 filed on Dec. 2, 2015 on behalf of Saint-Gobain Glass France, dated Nov. 16, 2018. 12 pages. (Chinese Original + English Summary).
Chinese Office Action for Chinese Application No. 201680000920.0 filed on Sep. 27, 2016 on behalf of Saint-Gobain Glass France, dated Aug. 31, 2018. 22 pages. (Chinese Original + English Translation).
Chinese Office Action for Chinese Application No. 201680000923.4 filed on Sep. 27, 2016 on behalf of Saint-Gobain Glass France, dated Aug. 31, 2018. 22 pages. (Chinese Original + English Translation).
International Preliminary Report on Patentability for International Application No. PCT/EP2012/053245 filed on Feb. 27, 2012 on behalf of Saint-Gobain Glass France, dated Oct. 8, 2013. 17 pages. (English Translation + German Original).
International Preliminary Report on Patentability for International Application No. PCT/EP2016/056975 filed on Mar. 30, 2016 on behalf of Saint-Gobain Glass France, dated Oct. 10, 2017. 14 pages. (English Translation + German Original).
International Preliminary Report on Patentability for International Application No. PCT/EP2015/078342 filed on Dec. 2, 2015 on behalf of Saint-Gobain Glass France,dated Jun. 20, 2017. 12 pages. (English Translation + German Original).

(56) References Cited

OTHER PUBLICATIONS

International Preliminary Report on Patentability for PCT Patent Application No. PCT/EP2016/056974 filed on Mar. 30, 2016 on behalf of Saint-Gobain Glass France, dated Oct. 10, 2017. 14 pages. (English Translation + German Original).
International Search Report for International Application No. PCT/EP2012/053245, filed on Feb. 27, 2012, on behalf of Saint-Gobain Glass France, dated May 11, 2012. 5 pages. (English Translation + German Original).
International Search Report for International Application No. PCT/EP2015/078342 filed Dec. 2, 2015 on behalf of Saint-Gobain Glass France, dated Mar. 8, 2016. 4 pages. (English Translation + German Original).
Japanese Office Action for Japanese Application No. 2017-552950 filed on Oct. 6, 2017 on behalf of Saint-Gobain Glass France, dated Nov. 28, 2018. 9 pages. (Japanese Original + English Translation).
Japanese Office Action for Japanese Application No. 2017-552951 filed on Oct. 6, 2017 on behalf of Saint-Gobain Glass France, dated Nov. 21, 2018, 6 pages. (Japanese Original + English Translation).
Korean Office Action for Korean Application No. 10-2017-7027615 filed on Sep. 28, 2017 on behalf of Saint-Gobain Glass France, dated Jul. 19, 2018. 11 pages. (Korean Original—English Translation).
Non-Final Office Action for U.S. Appl. No. 15/525,935, filed on May 10, 2017, on behalf of Saint-Gobain Glass France, dated Oct. 29, 2018. 24 pages.
Notice of Allowance for U.S. Appl. No. 14/110,124, filed on Nov. 21, 2013, on behalf of Saint-Gobain Glass France, dated Sep. 18, 2015. 13 pages.
Notice of Allowance for U.S. Appl. No. 15/525,935 filed on May 10, 2017 on behalf of Saint-Gobain Glass France, dated Mar. 21, 2019. 13 pages.
Restriction Requirement for U.S. Appl. No. 14/110,124, filed on Nov. 21, 2013, on behalf of Saint-Gobain Glass France, dated Jun. 10, 2015. 11 pages.
Written Opinion for International Application No. PCT/EP2015/078342 filed Dec. 2, 2015 on behalf of Saint-Gobain Glass France, dated Mar. 8, 2016. 10 pages (English Translation + German Original).
Written Opinion for International Application No. PCT/EP2012/053245, filed on Feb. 27, 2012, on behalf of Saint-Gobain Glass France, dated May 11, 2012. 15 pages.

\* cited by examiner (a) Printing and firing an antenna structure (4) made of an electrically conductive paste, preferably a silver-containing screen printing paste, on the internal surface (IV) of an inner pane (1)

(b) Connecting a dielectric carrier element (9) via an external surface (V) to the internal surface (IV) of the inner pane (1), wherein an electrically conductive base plate (5) arranged on the internal surface (VI) of the carrier element (9) is arranged at least in the region of the orthogonal projection of the antenna structure (4) relative to the inner pane (1).

Fig. 6A

ANTENNA PANE

CROSS REFERENCE TO RELATED APPLICATIONS

The present application is the U.S. national stage of International Patent Application PCT/EP2016/056975 filed internationally on Mar. 30, 2016, which, in turn, claims priority to European Patent Application No. 15162764.3 filed on Apr. 8, 2015.

The invention relates to an antenna pane, a method for producing the antenna pane, and use thereof.

A system for navigation using the Global Navigation Satellite System (GNSS) is often integrated into modern vehicles. Systems in operation are, for example, the Global Positioning System (GPS) or the GLObal Navigation Satellite System (GLONASS). The antennas necessary for this can be arranged on the car body and thus outside the vehicle interior, as is known, for example, from US 20140176374 A1. Such antennas are losing their appeal since they negatively affect the aesthetic appearance of the vehicle, can cause wind noise, and are susceptible to damage and vandalism.

Alternatively, GNSS antennas can be arranged within the vehicle interior, for example, below the dashboard or below the windshield. In this case, it is difficult to find a suitable position with a good antenna view of the GNSS satellites and, at the same time, to avoid EMC problems due to electrical devices in the dashboard and due to the vehicle engine. Furthermore, electrically conductive layers such as infrared reflecting layers or low-E layers can prevent the transmission of electromagnetic radiation through the pane and block the GNSS signal.

Typical GNSS antennas are realized as planar antennas and, typically, as patch antennas, and are known, for example, from DE 202006011919 U1. Here, a flat metallic antenna structure is arranged on one side of a ceramic carrier. A flat, metallic base plate is arranged on the opposite side as a grounding surface. The antenna structure and the base plate are connected to an electrical reception unit via electrical lines. Due to the material thickness of the ceramic carrier, the antenna is very thick and is customarily mounted in a housing on the dashboard.

The object of the present invention consists in providing an improved antenna pane in which an antenna and, in particular, a GNSS antenna can be integrated easily and economically.

The object of the present invention is accomplished according to the invention by an antenna pane in accordance with the independent claims. Preferred embodiments are disclosed in the subclaims.

The antenna pane according to the invention comprises at least the following features:
an inner pane having an internal surface (IV),
an antenna structure, produced from an electrically conductive paste, which is printed and fired on the internal surface (IV) of the inner pane,
a dielectric carrier element that is connected to the internal surface (IV) of the inner pane via an external surface (V), preferably by gluing, and has an electrically conductive base plate on an internal surface (VI) of the carrier element,
wherein
the base plate is arranged at least in the region of the orthogonal projection of the antenna structure relative to the inner pane.

The antenna pane according to the invention includes an antenna structure made of an electrically conductive paste fired on the internal surface of the inner pane. The antenna pane is characterized structurally by the antenna structure produced by printing and firing an electrically conductive paste. The antenna structure produced in this manner clearly differs from antenna structures produced in other ways and can be easily identified on the antenna pane according to the invention.

The particular advantage of the invention resides in the fact that an inner pane or composite pane with an antenna structure made of an electrically conductive paste, fixedly fired on the surface of the pane can be produced as a first intermediate product. The antenna structure is attached to the pane such that it is stable during handling and storage. The antenna is completed at the end of the production process or only at the later point of use in that a carrier element with an electrically conductive base plate is attached at the location provided therefor via the antenna structure. This is done particularly simply by gluing the carrier element onto the pane. By means of suitable dielectric properties of the carrier element and the distance between the antenna structure and the base plate defined by the carrier element, an antenna arrangement is obtained which reproducibly has very good reception and transmission properties. At the same time, the carrier element can be implemented very thin such that the arrangement situated on the pane is aesthetically quite inconspicuous and readily concealable. The carrier element can, for example, be very simply integrated into a holding mechanism or into a cover for a camera or sensor system and is then very inconspicuous visually and not visible from the interior side.

For the antenna function, it is important that a substantially homogeneous electrical field can form across the dielectric between the antenna structure and the base plate. Consequently, the base plate is preferably implemented in the shape of a plate, for example, as a foil or layer, and preferably has a constant thickness. In an alternative embodiment, at least the side of the base plate facing the antenna structure is planar, while the side facing away from the antenna structure can have any shape. For example, a contact blade or other contacting and fixing elements can be arranged on the side facing away from the antenna structure. In an advantageous embodiment of the antenna pane according to the invention, the antenna structure and the base plate are arranged substantially parallel to one another. In the context of the invention, a "planar" antenna structure or base plate means a structure that is arranged substantially in one plane but nevertheless follows a slight curvature of a pane surface, wherein the change in height is slight relative to the lateral expansion.

The base plate according to the invention preferably serves as a grounding surface, i.e., it can be connected to an electrical ground reference, for example, the ground reference of a transmitting or receiving electronic system, and in particular to the ground reference of a vehicle.

Another aspect of the invention comprises an antenna composite pane, which includes at least one antenna pane according to the invention, wherein an external surface (III) of the inner pane is connected to an internal surface (II) of an outer pane via at least one intermediate layer.

The antenna pane according to the invention is suitable for separating an interior, for example, a vehicle interior, from an external environment. The signal source of the antennas of the antenna pane or a receiving unit that can receive signals of the antenna of the antenna pane is regularly situated in the external environment ("exterior", for short). If the antenna pane is used for satellite navigation, the satellites are situated in the exterior. The respective surfaces of the antenna pane are defined thereby: internal surface (II,IV,VI) means that they face the interior, and external surface (I,III,V) means that they are turned away from the interior. In the case of use for satellite navigation, the external surface (I,III,V) is thus the side facing the satellite signal source.

By means of the arrangement according to the invention of the antenna structure and the base plate, the antenna structure is turned directly toward a signal source, for example, a GNSS satellite. The base plate is arranged on the side of the antenna structure turned away relative to the signal source.

All electrically insulating substrates that are thermally and chemically stable as well as dimensionally stable under the conditions of the production and the use of the antenna pane according to the invention are basically suitable as an inner pane and, optionally, an outer pane.

The inner pane and/or the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyester, polyvinyl chloride, and/or mixtures thereof. The inner pane and/or the outer pane are preferably transparent, in particular for use of the antenna pane in a vehicle, for example, as a windshield or rear window or other uses where high light transmittance is desired. In the context of the invention, a pane that has transmittance greater than 70% in the visible spectral range is considered "transparent". For vehicle antenna panes that are not positioned within the traffic-relevant field of vision of the driver, for example, for roof panels, the transmittance can also be much lower, for example, greater than or equal to 5%.

The thickness of the inner pane and/or the outer pane can vary widely and thus be ideally adapted to the requirements of the individual case. Preferably, standard thicknesses of 1.0 mm to 25 mm, preferably from 1.4 mm to 2.5 mm, are used for vehicle glass. The size of the inner pane and/or the outer pane can vary widely and is governed by the size of the use according to the invention. The inner pane and/or the outer pane have, for example, in the automotive sector, customary areas from 200 cm$^2$ up to 3 m$^2$.

The antenna pane or the antenna composite pane can have any three-dimensional shape. Preferably, the three-dimensional shape has no shadow zones, so it can, for example, be coated by cathodic sputtering. Preferably, the inner pane and the outer pane are flat or slightly curved in one or a plurality of spatial directions. In particular, flat panes are used. The panes can be colorless or colored.

The inner pane and/or the outer pane preferably have relative permittivity $\varepsilon_{r,1/2}$ from 2 to 8 and particularly preferably from 6 to 8. With such relative permittivities, it was possible to obtain particularly good antenna reception and transmission properties.

In an antenna composite pane, the inner pane and the outer pane are connected to one another by at least one intermediate layer. The intermediate layer is preferably transparent. The intermediate layer preferably contains at least one plastic, preferably polyvinyl butyral (PVB), ethylene vinyl acetate (EVA), and/or polyethylene terephthalate (PET). However, the intermediate layer can also, for example, contain polyurethane (PU), polypropylene (PP), polyacrylate, polyethylene (PE), polycarbonate (PC), polymethylmethacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The intermediate layer can be formed by one or even by a plurality of films arranged one above another or side-by-side, wherein the thickness of a film is preferably from 0.025 mm to 1 mm, typically 0.38 mm or 0.76 mm. The intermediate layers can preferably be thermoplastic and, after lamination, can bond the inner pane and the outer pane and possible other intermediate layers to one another.

The intermediate layer preferably has relative permittivity $\varepsilon_{r,3}$ from 2 to 4 and particularly preferably from 2.1 to 2.9. With such relative permittivities, it was possible to obtain particularly good antenna properties.

The dielectric carrier element has an external surface (V) and an internal surface (IV), with the terms "external" and "internal" being defined relative to subsequent installation of the antenna pane for separating an interior.

The carrier element according to the invention has an electrically conductive base plate on its internal surface (VI). The carrier element according to the invention is connected to the internal surface (IV) of the inner pane via its external surface (V). The carrier element is preferably glued onto the inner pane. The gluing can extend over the entire contact surface between the carrier element and the inner pane. In an advantageous embodiment of the invention, the adhesive of the gluing is arranged in a region that is not situated directly between the antenna structure and the carrier element, but, rather, in a region surrounding the antenna structure. This has the particular advantage that no adhesive is arranged between the antenna structure and the base plate and the antenna properties can thus be more precisely and reproducibly adjusted.

The dielectric carrier element is advantageously implemented such that it holds the antenna structure and the base plate at a fixed distance from one another, with the distance preferably constant over the entire region between the antenna structure and the base plate and the antenna structure arranged parallel to the base plate. For this, the carrier element can be a solid material, preferably a plate made of a solid material, or can have hollow spaces, cutouts, or material-free regions. The carrier element can, with an adequately thick, self-supporting base plate, also be implemented only in the form of a frame.

The dielectric carrier element is advantageously implemented plate-shaped, at least in the region between the antenna structure and the base plate, and has a constant material thickness (thickness).

The thickness of the carrier element is advantageously from 0.5 mm to 10 mm and particularly preferably from 1 mm to 4 mm. Such thicknesses are particularly advantageous, since, on the one hand, good antenna properties can thus be obtained, and, at the same time, the arrangement of the carrier and the base plate installed on the inner pane is not very visible. Furthermore, this arrangement can be integrated well into a cover, such as a camera or sensor cover.

In an advantageous embodiment of the antenna pane according to the invention, the carrier element contains or is made of a plastic, preferably polycarbonate, acrylonitrile butadiene styrene copolymer (ABS), polyethylene (PE), polypropylene (PP), polyvinyl chloride (PVC), polystyrene (PS), polybutylene terephthalate (PBT), polyamide, or polyethylene terephthalate (PET).

The carrier element then preferably has relative permittivity of 2 to 4 and particularly preferably of 2.7 to 3.3. Such permittivities are particularly advantageous, since with them, particularly good antenna properties can be obtained, in particular with the aforementioned thicknesses of the carrier element.

In a particularly advantageous embodiment of the antenna pane according to the invention, the carrier element is a region of a cover, in particular a camera or sensor cover. The carrier element can also be a region of a holding mechanism (bracket) that is glued on the inner pane. A cover, in particular a camera or sensor cover, can be attached on the holding mechanism. The attaching can be done, for example, by gluing, fusing, screwing, riveting, or by locking using a snap-in connection.

In all cases, the base plate is arranged at least in the region of the orthogonal projection of the antenna structure relative to the inner pane. This means that when looking through the antenna pane from the side turned away from the signal source of the antenna signal, i.e., looking at the internal surface (IV) of the antenna pane, only the base plate is visible and the base plate completely obscures the view of the antenna structure.

In an advantageous embodiment of the invention, the area of the base plate is greater than the area of the antenna structure, preferably greater by at least 10%, and particularly preferably greater by at least 25%. In another advantageous embodiment of the invention, the base plate protrudes, in the orthogonal projection of the antenna structure, beyond the outline of the antenna structure by at least 2 mm in each case, preferably by at least 5 mm, and in particular, by at least 10 mm.

The antenna structure has a base with a ratio of length $l_A$ to width $b_A$ of 1:1 to 10:1, preferably of 1:1 to 2:1, and particularly preferably of 1:1 to 1.1:1. The base of the antenna structure is preferably a rectangle, a square, a trapezoid, a polygon with more than four corners, an ellipse, or a circle. In the case of a rectangle, the length $l_A$ corresponds to the length of the longer side of the rectangle and the width $b_A$ corresponds to the length of the shorter side of the rectangle. In the case of a square or substantially square base with equal side lengths, the length $l_A$ and the width $b_A$ consequently have a ratio of 1:1. In the case of a nonrectangular and, in particular, an elliptical structure, the length $l_A$ is determined by the maximum length of the structure and the width $b_A$ is determined by the length of the direction running orthogonal to the length $l_A$. In the case of a circular base, the length $l_A$ and the width $b_A$ have a ratio of 1:1.

In particular, with rectangular or square bases, in the context of the present invention, one, preferably two corners positioned diagonally opposite one another, and, particularly preferably, all corners can be beveled. Thus, the antenna structure can be advantageously tuned to the electromagnetic radiation to be received. The bevel advantageously amounts to less than 20% of the length $l_A$ and/or of the width $b_A$, preferably less than 10%.

The dimensions of the antenna structure depend, in general, on the desired frequency band and the respective use. For mobile communication in the frequency range from 0.8 GHz to 2.7 GHz, the antenna structure typically has a length $l_A$ and/or a width $b_A$ of 20 mm to 60 mm. For applications for satellite-supported navigation (GNSS) in the frequency range from 1.2 GHz to 1.7 GHz, the antenna structure typically has a length $l_A$ and/or a width $b_A$ of 30 mm to 40 mm.

In an advantageous embodiment of the invention, the antenna structure is optimized to a GPS signal with a frequency of 1575.42 MHz and a right circularly polarized electromagnetic plane of oscillation. For this, the antenna structure has a rectangular base with a length $l_A$ of 36 mm and a width $b_A$ of 34 mm and, consequently, a ratio of roughly 1.06:1.

The antenna structure can advantageously have other cutouts. Particularly advantageous is a slot-shaped cutout. In the case of a rectangular or square base of the antenna structure, the longer side of the slot-shaped cutout is preferably aligned parallel to and in particular along the diagonal of the base. The slot-shaped cutout has, for example, a rectangular shape, advantageously with a length $l_S$ of 5 mm to 20 mm, preferably of 7.5 mm to 12.5 mm, and a width $b_S$ of 0.5 mm to 5.0 mm, preferably of 0.9 mm to 3.1 mm.

Furthermore, the antenna structure can have rectangular cutouts that are arranged on both sides of the electrical line connection between the antenna structure and the signal line in the base of the antenna structure. These rectangular cutouts have the particular advantage that they enable particularly good coupling or decoupling of the antenna signal in or out of the antenna structure. The antenna signal can then be fed via the signal line to transmitting or receiving electronics.

The antenna structure according to the invention is made of a printed and fired electrically conductive paste, preferably a silver-containing screen printing paste. In an advantageous embodiment of the invention, the base plate is likewise made of a printed and fired electrically conductive paste, preferably a silver-containing screen printing paste. An advantageous printed antenna structure and/or base plate according to the invention has a thickness of 3 μm to 20 μm and/or a sheet resistance of 0.001 ohm/square to 0.03 ohm/square, preferably on 0.002 ohm/square to 0.018 ohm/square. Such antenna structures and base plates are easy to integrate into the industrial production process and to produce economically.

In another advantageous embodiment of the invention, the base plate is made of an electrically conductive foil, preferably a metal foil and, in particular, a copper, silver, gold, or aluminum foil. The electrically conductive foil advantageously has a thickness of 50 μm to 1000 μm and preferably of 100 μm to 600 μm. The electrically conductive foil advantageously has conductivity of $1*10^6$ S/m to $10*10^7$ S/m and preferably of $3.5*10^7$ S/m to $6.5*10^7$ S/m.

It is understood that such foils are preferably adhesively bonded to the carrier element, for example, using a thin adhesive film or a double-sided adhesive tape. Base plates thus designed are particularly advantageous since the base plate with a carrier element can be made of one unit and can be glued onto the inner pane conveniently and with accurate positioning during assembly.

In an advantageous embodiment of the antenna pane according to the invention, the antenna structure and the base plate are arranged on the outer edge of the pane. In this case, the maximum distance to the outer edge is preferably less than 20 cm, particularly preferably less than 10 cm. This allows concealing the antenna structure, the base plate, and feed lines under a visually inconspicuous black imprint or with a cover, for example, a sensor or camera housing.

In another advantageous embodiment of the antenna pane according to the invention, the antenna foot point of the antenna structure is guided via a flat conductor to the edge of the carrier element and around this onto the internal surface (IV) of the carrier element. Alternatively, the flat conductor can be guided through an opening in the carrier element on its internal surface (IV). Here, the flat conductor is preferably implemented as a strip conductor and preferably as a coplanar strip conductor, whose signal line is electrically conductively coupled with the antenna structure and whose shield is electrically conductively coupled with the base plate. Here, "electrically conductively coupled" preferably means "galvanically coupled". The signal line is preferably connected to the antenna structure by clamping, with the clamping generated by the carrier element glued onto the inner pane, with one end of the signal line of the strip conductor connected to the antenna structure via a pressure contact. Alternatively, the signal line can be capacitively coupled to the antenna structure.

In another advantageous embodiment of the antenna pane according to the invention, the base plate and the shield of the strip conductor are implemented in one piece. This avoids conduction losses at transitions between various sections of the antenna. Furthermore, such a one-piece structure is particularly simple to produce when the respective elements are arranged on a common carrier film. The one-piece structure is preferably guided around one side edge of the carrier element and glued to the carrier element.

The strip conductor is preferably implemented as a foil conductor or a flexible foil conductor (flat conductor, flat ribbon conductor). The term "foil conductor" means an electrical conductor whose width is significantly greater than its thickness. Such a foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheathing, polyimide-based, for example. Suitable foil conductors according to the invention have a total thickness of, for example, only 0.3 mm. Such thin foil conductors can be arranged without difficulty between the inner pane and the carrier element. Multiple conductive layers, electrically isolated from each other can be situated in one foil conductor strip.

Alternatively, thin metal wires can also be used as an electrical feed line. The metal wires contain in particular copper, tungsten, gold, silver, or aluminum or alloys of at least two of these metals. The alloys can also contain molybdenum, rhenium, osmium, iridium, palladium, or platinum.

The electrical line connection between the antenna structure and the signal line and/or the base plate and the ground lead or shield is preferably done via electrically conductive adhesives or via a solder joint, both of which enable a reliable and durable electrical line connection between the connection region and the feed line. Alternatively, the electrical line connection can also be done by clamping since the clamp connection is fixed by adhesively bonding the carrier element to the inner pane. Alternatively, the electrical line connection can also be produced by soldering, in particular between the base plate and the shield.

In another advantageous embodiment of the antenna pane according to the invention, the base plate has a grounding region and a capacitive coupling region for the capacitive decoupling of the antenna signal. The capacitive coupling region can be connected to the base plate with high impedance using high-frequency technology or preferably electrically insulated therefrom. The antenna signal is capacitively coupled to a capacitive coupling region in the plane of the base plate via the dielectric carrier element. The capacitive coupling region is then connected to a region of the signal line of the foil conductor or implemented in one piece therewith. This is particularly advantageous since the signal line for the antenna signal and the ground lead or shield can be produced in a simple manner on one plane with a single strip conductor. The antenna structure between the inner pane and the carrier element does not have to be contacted separately and no separate conductor has to be guided out between the carrier element and the inner pane, such that the carrier element rests particularly flat on the inner pane.

In another advantageous embodiment of the antenna pane according to the invention, the flat conductor and/or the base plate is arranged on a carrier film. The carrier film preferably contains a polymer and particularly preferably contains or is made of polyimide or polyethylene terephthalate (PET). The carrier film has relative permittivity of 2 to 4 and particularly preferably of 2.7 to 3.3.

Another aspect of the invention relates to an antenna pane arrangement, which at least comprises:
  an antenna pane according to the invention or an antenna composite pane according to the invention
  receiving or transmitting electronics, which are electrically coupled with the antenna structure and the base plate,
wherein the antenna pane or the antenna composite pane is arranged as glazing in a vehicle body.

The base plate preferably serves as a grounding surface, with the base plate being connected in this case to an electrical ground reference of the vehicle.

The various designs and embodiments of the antenna pane according to the invention described above can be realized alone or in any combination.

Another aspect of the invention includes a method for producing an antenna pane, in particular an antenna pane according to the invention implemented as described above, wherein at least:
(a) an antenna structure made of an electrically conductive paste, preferably a silver-containing screen printing paste, is printed and fired on the internal surface (IV) of an inner pane,
(b) a dielectric carrier element is connected to the internal surface (IV) of the inner pane via an external surface (V), wherein an electrically conductive base plate arranged on the internal surface (VI) is arranged at least in the region of the orthogonal projection of the antenna structure relative to the inner pane.

In an advantageous embodiment of the method according to the invention, the carrier element is connected to the inner pane by gluing with an adhesive. The adhesive preferably consists of single-component or two- (or more-)component adhesive systems. Particularly preferred are acrylate adhesives, methylmethacrylate adhesives, cyanoacrylate adhesives, phenol formaldehyde resin adhesives, epoxy resin adhesives, polyurethane adhesives (PUR), silicone adhesives, and/or silane cross-linking polymer adhesives, mixtures and/or copolymers thereof.

Another aspect of the invention includes a method for producing an antenna composite pane, wherein at least:
(a) an antenna structure made of an electrically conductive paste, preferably a silver-containing screen printing paste, is printed and fired on the internal surface (IV) of an inner pane,
(b) a layer sequence of the inner pane, at least one intermediate layer, and an outer pane is produced, and the layer sequence is laminated to form a composite pane,
(c) a dielectric carrier element is connected to the internal surface (IV) of the inner pane via an external surface (V), wherein an electrically conductive base plate arranged on the internal surface (VI) is arranged at least in the region of the orthogonal projection of the antenna structure relative to the inner pane.

The lamination, i.e., the bonding of the inner pane and the outer pane via the intermediate layer in process step (b) is preferably done under the action of heat, vacuum, and/or pressure. Methods known per se for producing a composite pane can be used.

For example, so-called "autoclave methods" can be performed at an elevated pressure of roughly 10 bar to 15 bar and temperatures from 130° C. to 145° C. for roughly 2 hours. Vacuum bag or vacuum ring methods known per se operate, for example, at roughly 200 mbar and 80° C. to 110° C. The inner pane, the thermoplastic intermediate layer, and the outer pane can also be pressed in a calender between at least one pair of rollers to form a pane. Systems of this type for producing panes are known and normally have at least one heating tunnel upstream from a pressing unit. The temperature during the pressing operation is, for example, from 40° C. to 150° C. Combinations of calender and autoclave methods have proved particularly valuable in practice. Alternatively, vacuum laminators can be used. These consist of one or a plurality of heatable and evacuable chambers, in which the inner pane and the outer pane are laminated within, for example, roughly 60 minutes at reduced pressures from 0.01 mbar to 800 mbar and temperatures from 80° C. to 170° C.

Another aspect of the invention includes the use of the antenna pane according to the invention or the antenna composite pane according to the invention in means of transportation for travel on land, in the air, or on water, in particular in trains, watercraft, and motor vehicles, for example, as a windshield, rear window, side window, and/or roof panel, in furniture or in buildings.

The invention further includes the use of the antenna pane according to the invention or the antenna composite pane according to the invention for reception of GNSS signals for satellite-supported navigation, in particular of a right circularly polarized GPS signal with an L1 frequency of 1575.2 MHz and/or a GLONASS signal with a frequency of 1602 MHz±4 Mhz.

In the following, the invention is explained in detail with reference to drawings and exemplary embodiments. The drawings are schematic depictions and not true to scale. The drawings in no way restrict the invention.

They depict:

FIG. 1A a plan view of an embodiment of an antenna composite pane according to the invention, FIG. 1B an enlarged representation of the detail Z of FIG. 1A, FIG. 1C a cross-sectional view along the section line A-A' of FIG. 1B, FIG. 1D a cross-sectional view along the section line B-B' of FIG. 1B, FIG. 1E a cross-sectional view along the section line C-C' of FIG. 1B, FIG. 2 a schematic representation of an antenna pane according to the invention for satellite-supported navigation in a vehicle, FIG. 3A a plan view of an alternative embodiment of an antenna composite pane according to the invention, FIG. 3B an enlarged representation of the detail Z of FIG. 3A, FIG. 3C a cross-sectional view along the section line A-A' of FIG. 3B, FIG. 3D a cross-sectional view along the section line B-B' of FIG. 3B, FIG. 4A a plan view of another alternative embodiment of an antenna pane according to the invention, FIG. 4B an enlarged representation of the detail Z of FIG. 4A, FIG. 5 an enlarged representation of a detail Z of FIG. 4A with an alternative embodiment of an antenna structure according to the invention, FIG. 6A a detailed flowchart of an embodiment of the method according to the invention for producing an antenna pane, FIG. 6B a detailed flowchart of an embodiment of the method according to the invention for producing an antenna composite pane.

FIG. 1A depicts a plan view of an exemplary embodiment of an antenna pane according to the invention 100 using the example of an antenna composite pane 101.

FIG. 1B depicts an enlarged representation of the detail Z of the antenna composite pane 101 according to the invention of FIG. 1A. Here, the antenna composite pane 101 comprises, for example, an antenna pane 100, comprising an inner pane 1, which is connected to an outer pane 2 via an intermediate layer 3. The antenna composite pane 101 is, for example, the windshield of a passenger car. The dimensions of the antenna composite pane 101 are, for example, 0.9 m×1.5 m.

The inner pane 1 is, for example, intended to face the interior in the installed position. In other words, the internal surface IV of the inner pane 1 is accessible from the interior, whereas, in contrast the external surface I of the outer pane 2 faces outward relative to the vehicle interior. The inner pane 1 and the outer pane 2 are made, for example, of soda lime glass. The thickness of the inner pane 1 is, for example, 1.6 mm and the thickness of the outer pane 2 is 2.1 mm. it is understood that the inner pane 1 and the outer pane 2, for example, also can be implemented with the same thickness.

The intermediate layer 3 is a thermoplastic intermediate layer and is made, for example, of polyvinyl butyral (PVB). It has a thickness of 0.76 mm.

The view shown is a plan view of the external surface I of the outer pane 2 viewed from outside the vehicle.

FIG. 1C depicts a cross-sectional view along the section line A-A' of FIG. 1B. FIG. 1D depicts a corresponding cross-sectional view along the section line B-B' of FIG. 1B.

The antenna structure 4 and the base plate 5 are arranged on the lower pane edge 30 of the antenna pane 100. The antenna structure 4 consists in this example of a printed and fired electrically conductive paste, which consists predominantly of silver particles and glass frits. The antenna structure 4 is arranged on the internal surface IV of the inner pane 1. The antenna structure 4 consists in this example of a rectangular base with a length $l_A$ of 36 mm and a width $b_A$ also of 34 mm. The base of the antenna structure 4 has, in each case, on two opposite corners a triangular cutout 7, where, in each case, one of the corners of the square is removed. The triangular cutout 7 is, for example, an isosceles right triangle with a leg length of $a_D$=2.5 mm. The antenna structure 4 additionally has a slot-shaped cutout 6 with a rectangular shape and with a length $l_S$ of 9.5 mm and a width $b_S$ of 3 mm. The slot-shaped cutout 6 is arranged with its length along the diagonal of the rectangular base on which the triangular cutouts 7 are situated.

A dielectric carrier element 9 is arranged on the internal surface IV of the inner pane 1 with its external surface V in the region of the orthogonal projection of the antenna structure 4 relative to the inner pane 1. Here, the carrier element 9 is, for example, plate-shaped and formed from a solid material. The thickness of the carrier element 9 is, for example, uniformly $d_9$=2 mm. The carrier element 9 includes a plastic material, here, for example, acrylonitrile butadiene styrene copolymer (ABS). Carrier elements 9 made of, for example, polybutylene terephthalate (PBT) or polycarbonate (PC) can also be used. The carrier element 9 is implemented larger in its base than the antenna structure 4 and, in a subregion of the overhang, is glued to the inner pane 1 with an adhesive 21, for example, a polyurethane (PUR) adhesive.

The base plate 5 serves as a grounding surface and is arranged on the internal surface VI of the carrier element 9, i.e., on the side of the carrier element 9 facing away from the antenna structure 4. The base plate 5 is, for example, a copper foil with a thickness of 100 μm, which is glued to the carrier element 9. The base plate 5 has a rectangular base with a width $b_G$ of 6 cm and a length $l_G$ of 13 cm. The base plate 5 protrudes beyond the region of the orthogonal projection of the antenna structure 4 relative to the inner pane 1.

The antenna structure 4 is connected to the signal line 11 of a foil conductor 10 via an electrical line connection 13. Here, the foil conductor 10 is, for example, implemented over its entire length as a coplanar strip conductor. In other words, the planar signal line 11 is surrounded by two planar shields 12 (also referred to as shield conductors) arranged in a plane with the signal line 11. The foil conductor 10 thus consists of three inner conductors 15, namely the signal line 11 and two shields 12, which can, for example, be surrounded on one side and preferably on both sides by a carrier film that serves as electrical insulation 16. The inner conductors 15, i.e., the signal line 11 and the shields 12 are, for example, designed as copper foil with a width of 4 mm and a thickness of 100 μm. The three inner conductors 15 of the foil conductor 10 are, in this exemplary embodiment, arranged directly on the carrier element 9, and attached, for example, on the carrier element 9 by gluing such that no carrier film and no electrical insulation 16 are necessary. The signal line 11 and the shields 12 of the foil conductor 10 are guided from the external surface V of the carrier element 9 over its side edge 34 onto the internal surface VI of the carrier element 9. The electrical line connection 13 of the signal line 11 to the antenna structure 4 is done, for example, by clamping at the time of the gluing of the carrier element 9 on the inner pane 1.

The two shields 12 are electrically conductively connected on the internal surface VI of the carrier element 9 to the base plate 5 via an electrical line connection 13. The electrical line connection 13 is, for example, an electrically conductive adhesive or a solder joint. Alternatively, the electrical line connection 13 can be done by clamping the shields 12 onto the base plate 5.

Moreover, the foil conductor 10 has a connection element 14, for example, a coaxial SMA (sub-miniature A) plug for the connection to reception or transmission electronics and, here, in particular to GNSS reception electronics.

FIG. 1E depicts a cross-sectional view along the section line C-C' of FIG. 1B. The orthogonal projection of the antenna structure 4 extends over the surface A on the internal surface IV of the inner pane 1. The base plate 5 protrudes completely beyond the surface A of the orthogonal projection of the antenna structure 4.

The substantially rectangular base of the antenna structure 4 is arranged with one side edge parallel to the pane edge 30. It is understood that the side edge can even have a certain angle relative to the pane edge 30, for example, 45°. The signal line 11 is connected to the antenna structure 4 on the side edge of the antenna structure 4 directly adjacent the side edge 30. The slot-shaped cutout 6 and the diagonal with the triangular cutouts 7 run, viewed from the connection point of the signal line 11, from the bottom left to the top right.

The antenna structure 4 depicted is suitable to receive a right circular polarized GPS signal with an L1 frequency of 1575.42 MHz. The antenna structure 4 depicted is also suited to obtain good GLONASS reception.

The antenna structure 4 and the base plate 5 are arranged in a region of the antenna composite pane 101 in which a blockout print 32 in the form a black print is arranged on the internal surface II of the outer pane 2. The blockout print 32 is impermeable to visible light and prevents viewing the gluing in of the antenna composite pane 101 in a motor vehicle body or the antenna structure 4 or the base plate 5. The blockout print 32 is permeable to electromagnetic radiation in the frequency range of the antenna that is formed by the antenna structure 4 and the base plate 5. The action of the antenna is not substantially affected by the blockout print 32, or not at all.

FIG. 2 depicts an antenna pane according to the invention 100 in relation to the emission zone 41 of a satellite 40 for satellite-supported navigation. The antenna pane 100 comprises an inner pane 1, an antenna structure 4, a carrier element 9, and a base plate 5. The antenna pane 100 separates an interior region 50, for example, the passenger compartment of a vehicle (not depicted here) from an exterior 51. The antenna structure 4 is arranged on the internal surface IV of the inner pane 1. The internal surface IV is the surface of the inner pane 1 facing away from the satellite 40 and, hence, the source of the satellite signal. The carrier element 9 has, consequently, an external surface V, which faces in the direction of the exterior 51 and, hence, in the direction of the signal of the satellite 40, and an internal surface VI, which is turned away from the exterior 51. The base plate 5 is arranged on the internal surface VI of the carrier element 9 and, hence, on the interior side of the antenna structure 4.

FIG. 3A to 3D depict an alternative exemplary embodiment of an antenna composite pane 101 according to the invention in accordance with FIG. 1A to 1D, wherein only the electrical contacting of the antenna structure 4 is designed differently. As shown in FIG. 3A to 3D, the signal line 11 is arranged in the plane of the base plate 5 and the shield 12, with the signal line 11 transitioning in one piece into a capacitive coupling region 20. The signal line 11 is capacitively coupled to the antenna structure 4 via the dielectric carrier element 9 positioned therebetween. The antenna signal is coupled with the capacitive coupling region 20 of the signal line 11 via the dielectric carrier element 9 and directed to the connection element 14. This embodiment has the particular advantage that neither the signal line 11 nor the shield 12 has to be guided between inner pane 1 and carrier element 9. The complete electrical contacting is done via the plane in which the base plate 5 is arranged.

This embodiment is particularly advantageous when the carrier element 9 is in a region of a holding mechanism (bracket), for example, a sensor or camera cover. Such holding mechanisms are usually implemented much larger than the base plate 5 and the antenna structure 4. The signal line 11 would have to be guided around the edge of the holding mechanism and would then be very long. Alternatively, a holding mechanism would have to have a through-passage through which the signal line 11 and a possible shield 12 is guided. This is not necessary with the capacitive coupling depicted in FIG. 3A to 3D, since the base plate 5, the signal line 11, and the shield 12 are arranged on the internal surface VI of the holding mechanism. The design of the holding mechanism can thus be more simple and more compact.

FIG. 4A depicts a plan view of another alternative embodiment of an antenna composite pane 101 according to the invention. FIG. 4B depicts an enlarged representation of the detail Z of FIG. 4A.

The antenna composite pane 101 of FIG. 4A corresponds substantially in material and arrangement to the antenna composite pane 101 of FIG. 1A such that, in the following, only the differences between the antenna composite panes 101 are examined in detail. In contrast to FIG. 1A, the antenna structure 4 and the base plate 5 are arranged at the upper side edge 31 of the antenna composite pane 101. The antenna structure 4 and the base plate 5 are arranged here in a region of a communication window 33. For example, other sensors such as a rain sensor and/or a camera (not shown here) are arranged in the region of the communication window 33. The region of the communication window 33 is covered on the vehicle interior side by a plastic housing (not shown here), communication windows 33, within which the camera and/or the sensors are preferably arranged. Furthermore, the antenna composite pane 101 has, outside the region of the communication window 33, an electrically conductive coating, that is suitable for reflecting infrared radiation. The antenna structure 4 and the base plate 5 correspond in their materials and dimensions to the antenna structure 4 and base plate 5 of the exemplary embodiment of FIGS. 1A and 1B. In this example, the carrier element 9 is a holding mechanism (bracket), on which the plastic housing can be attached via a locking mechanism. The carrier element 9 is glued onto the internal surface IV of the inner pane 1 of the antenna composite pane 101.

Moreover, in this exemplary embodiment of an antenna structure 4 according to the invention, two rectangular cutouts 8 are arranged on both sides of the electrical line connection 13 between the antenna structure 4 and the signal line 11 in the base of the antenna structure 4. These rectangular cutouts 8 improve the decoupling of the antenna signal out of antenna structure 4.

The carrier element 9 has, in this example, a through-passage 22, through which the signal line 11 and the shields 12 are guided from the plane of the antenna structure 4 through the carrier element 9 to the plane of the base plate 5. On the plane of the base plate 5, the shield 12 is electrically conductively connected to the base plate 5, and the strip conductor 10, consisting of signal line 11 and shield 12, is connected to a connection element 14. The further signal routing is then done, for example, with the wiring harness, with which the other sensors in the plastic housing are contacted.

FIG. 5 depicts an alternative exemplary embodiment of an antenna composite pane 101 according to the invention of FIGS. 4A and 4B, wherein only the base of the antenna structure 4 has a different form than in FIGS. 4A and 4B. Here, the base is an ellipse, with the signal line 11 arranged at an angle of, for example, 45° relative to the major or minor axes. The length $l_A$ of the base of the antenna structure 4 corresponds in this example to the maximum diameter of the ellipse, i.e., the diameter in the direction of the major axis. The width $b_A$ corresponds in this example to the minimum diameter of the ellipse.

FIG. 6A depicts a flowchart of an exemplary embodiment of the method according to the invention for producing an antenna pane 100 according to the invention.

Figure 1A:
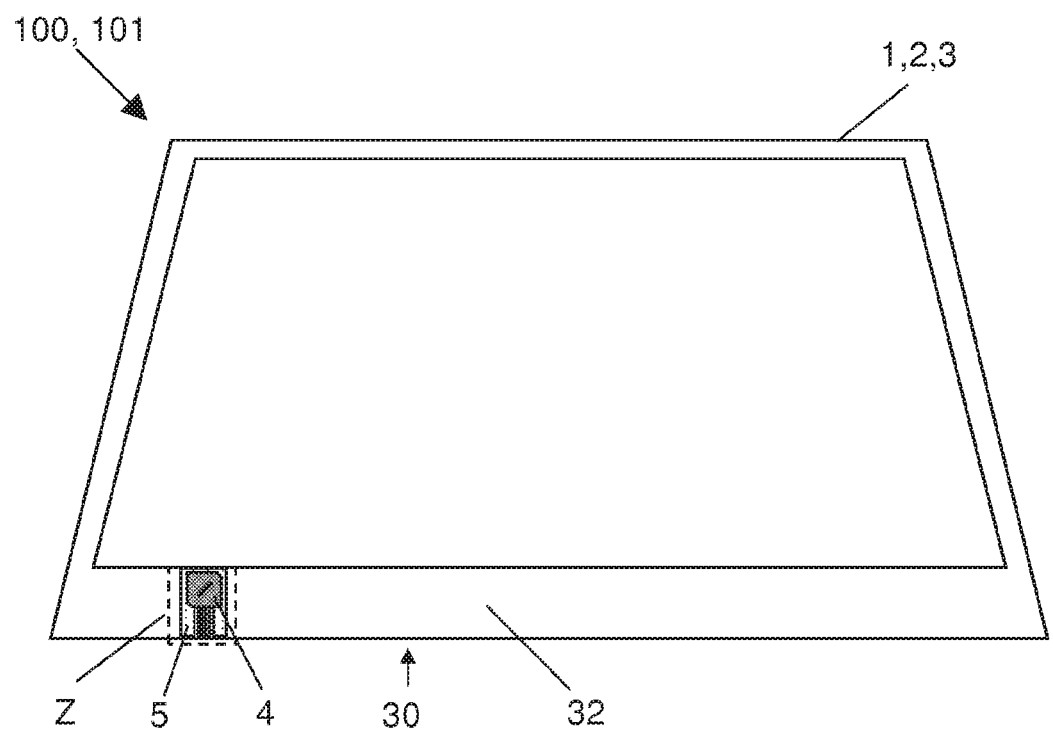
Figure 1B:
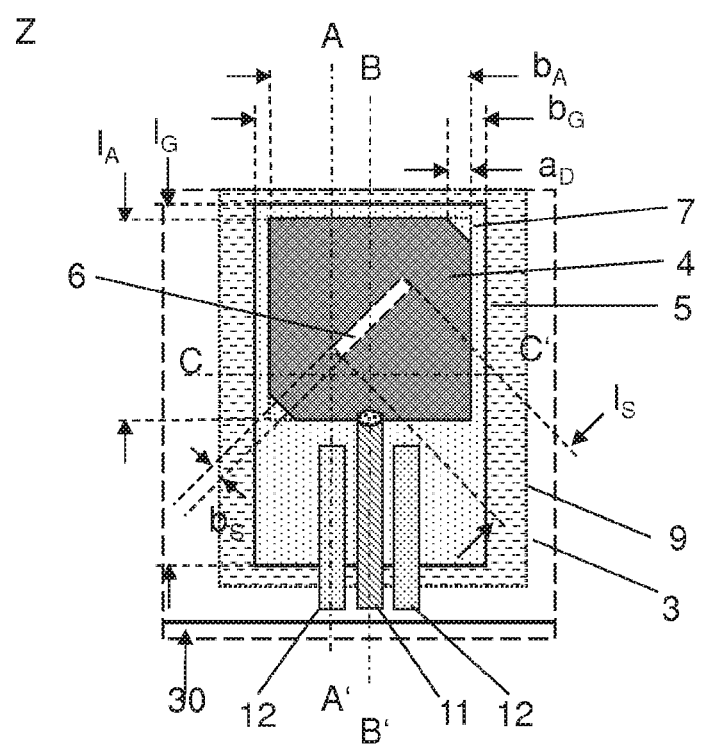
Figure 1C:
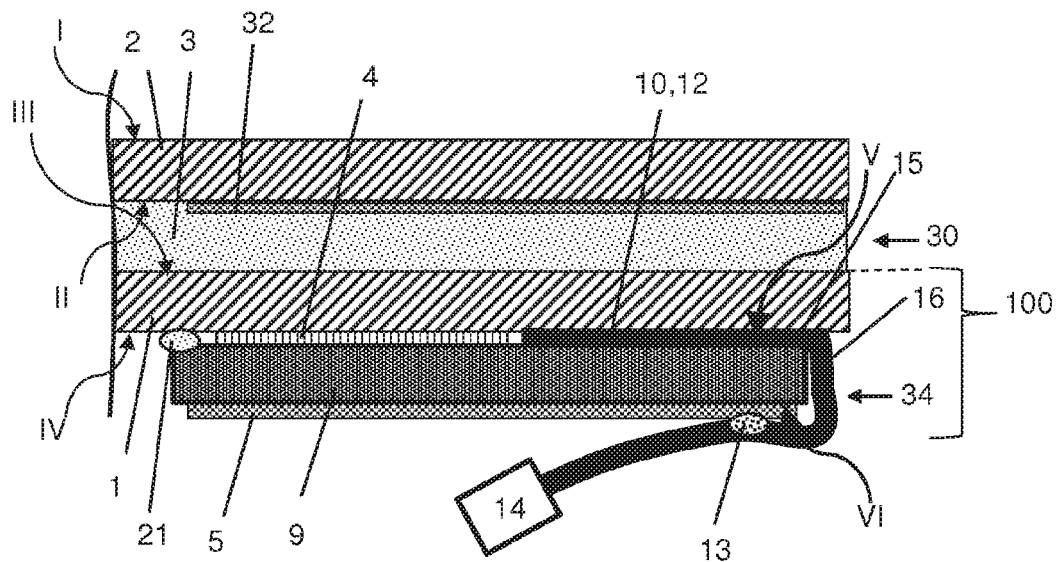
Figure 1D:
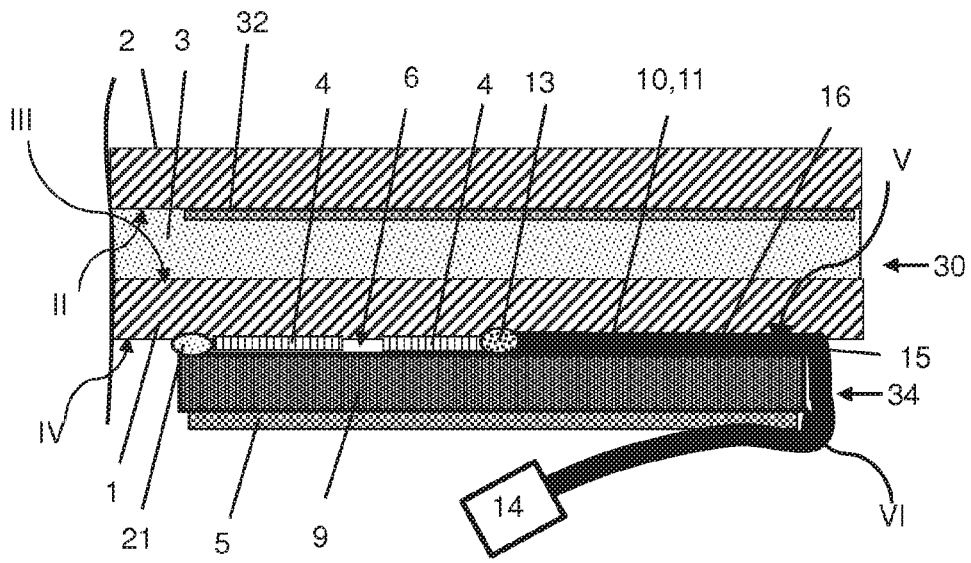
Figure 1E:
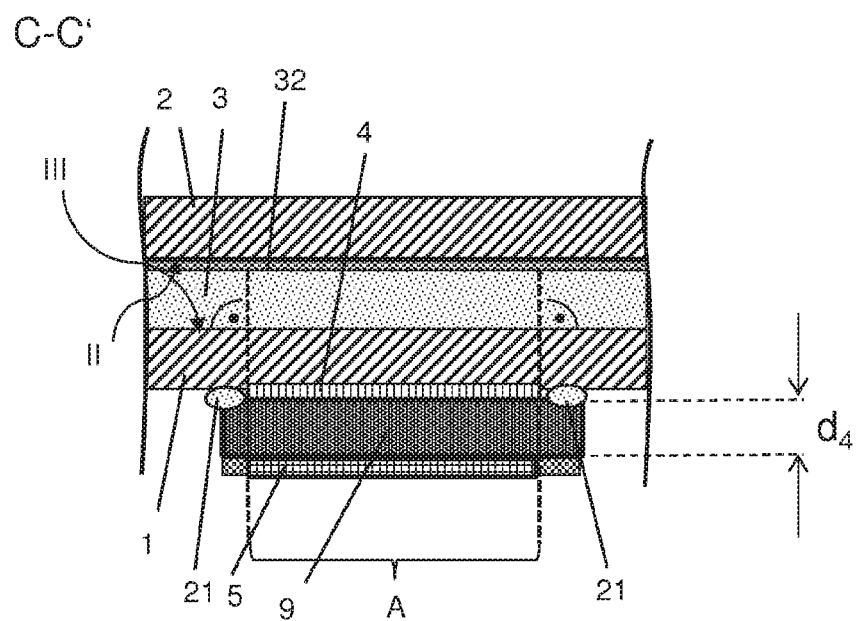
Figure 2:
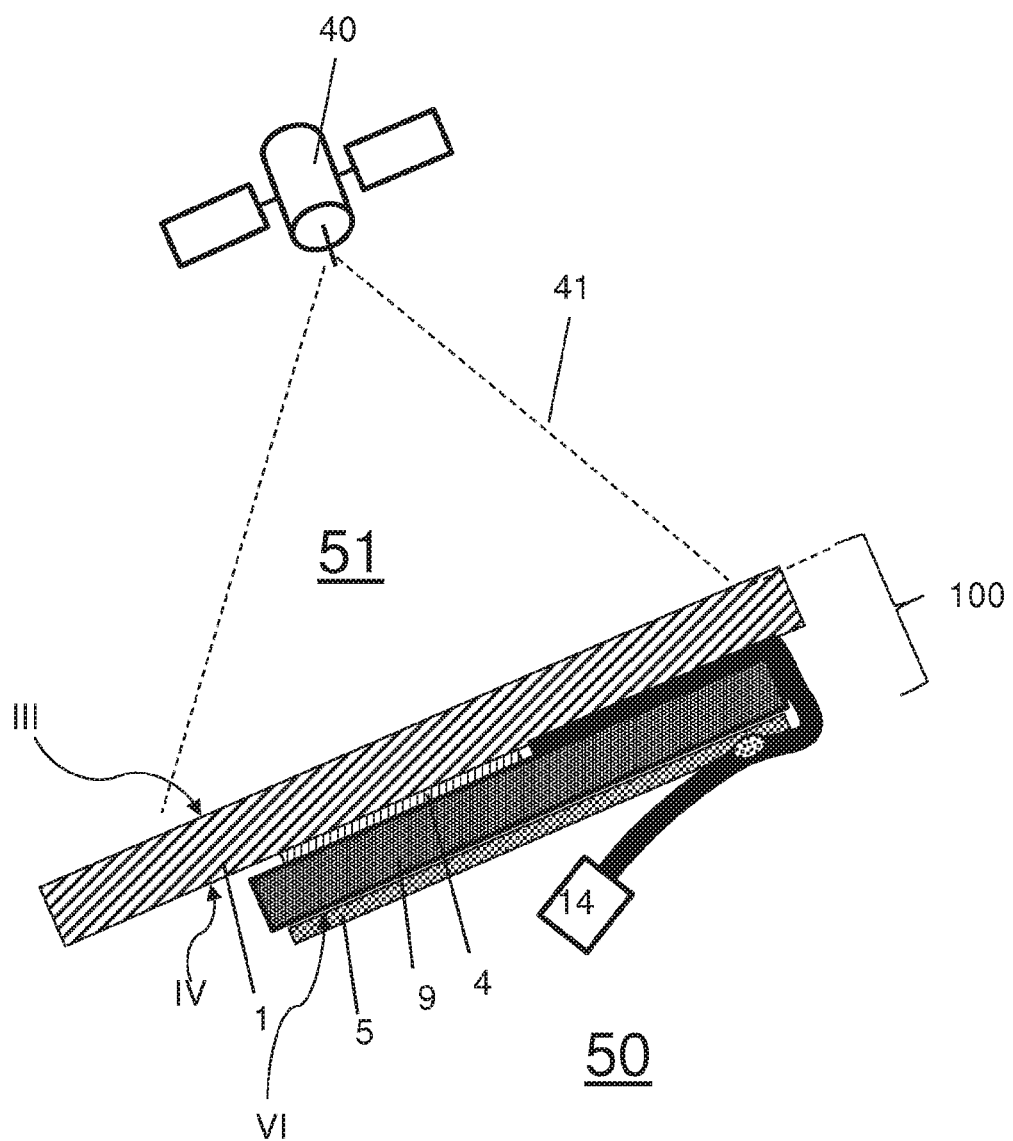
Figure 3A:
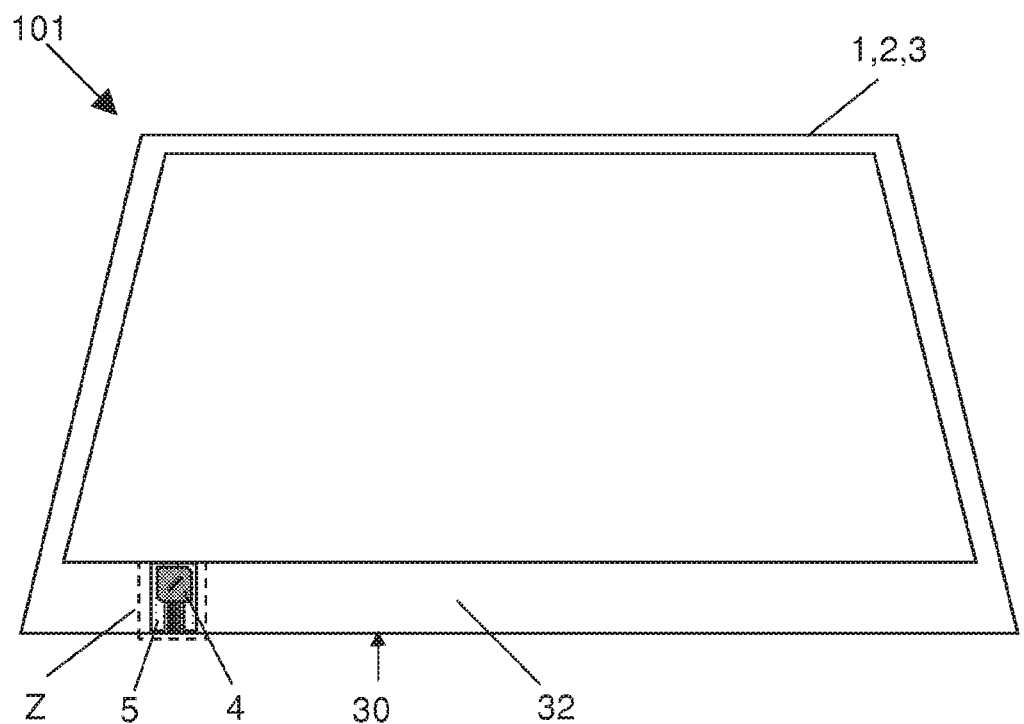
Figure 3B:
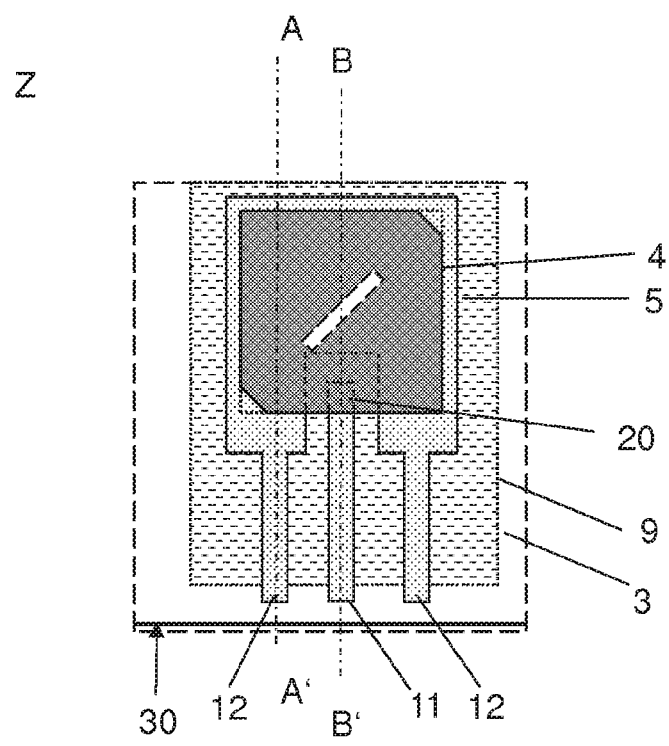
Figure 3C:
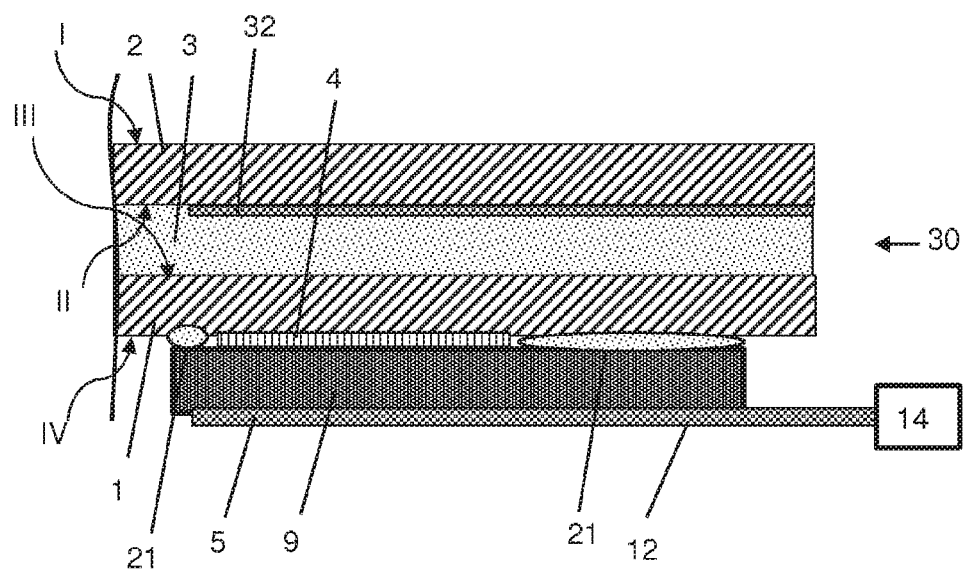
Figure 3D:
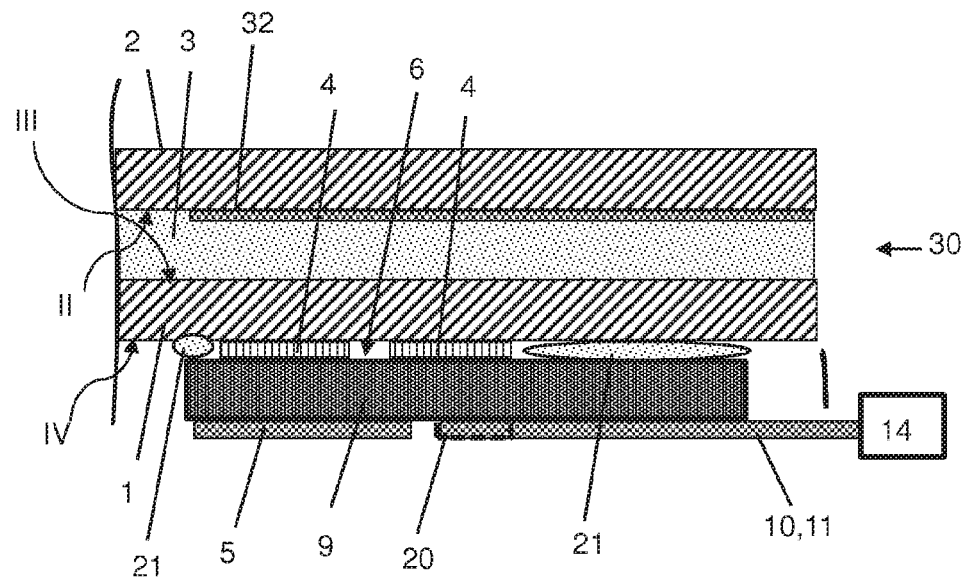
Figure 4A:
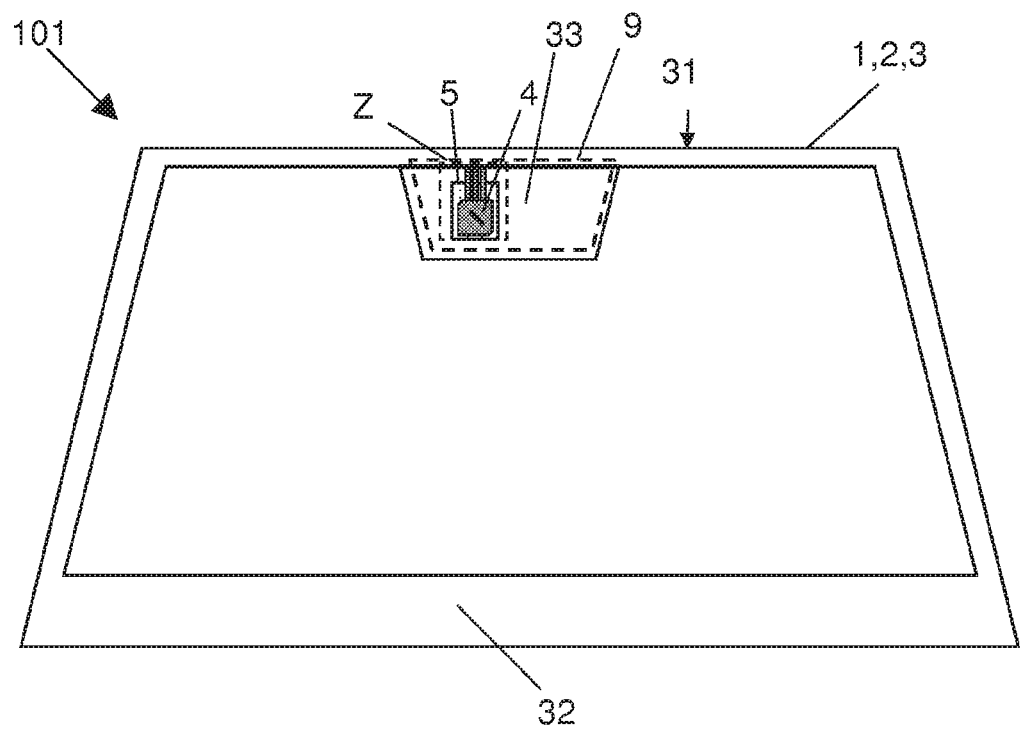
Figure 4B:
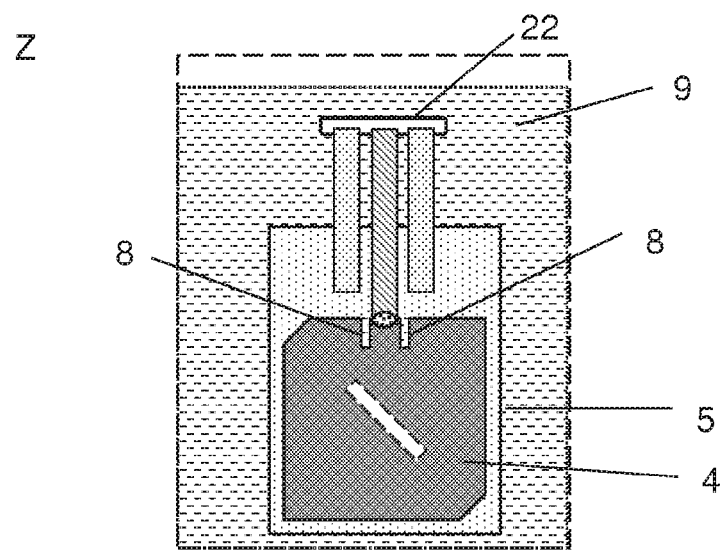
Figure 5:
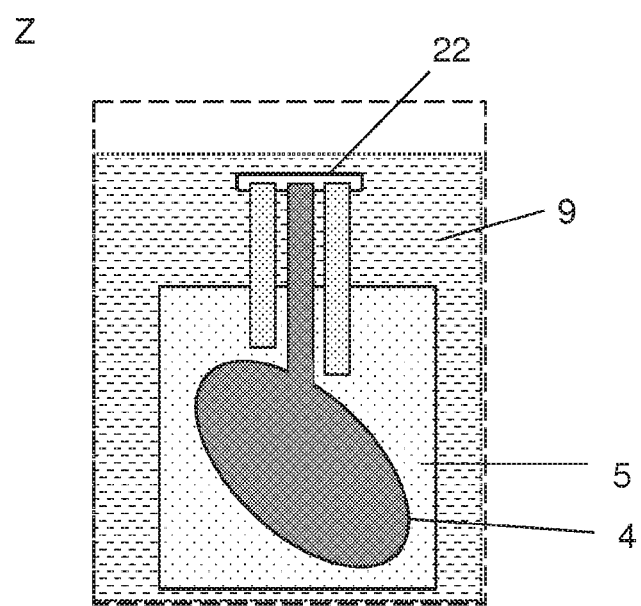
Figure 6B:
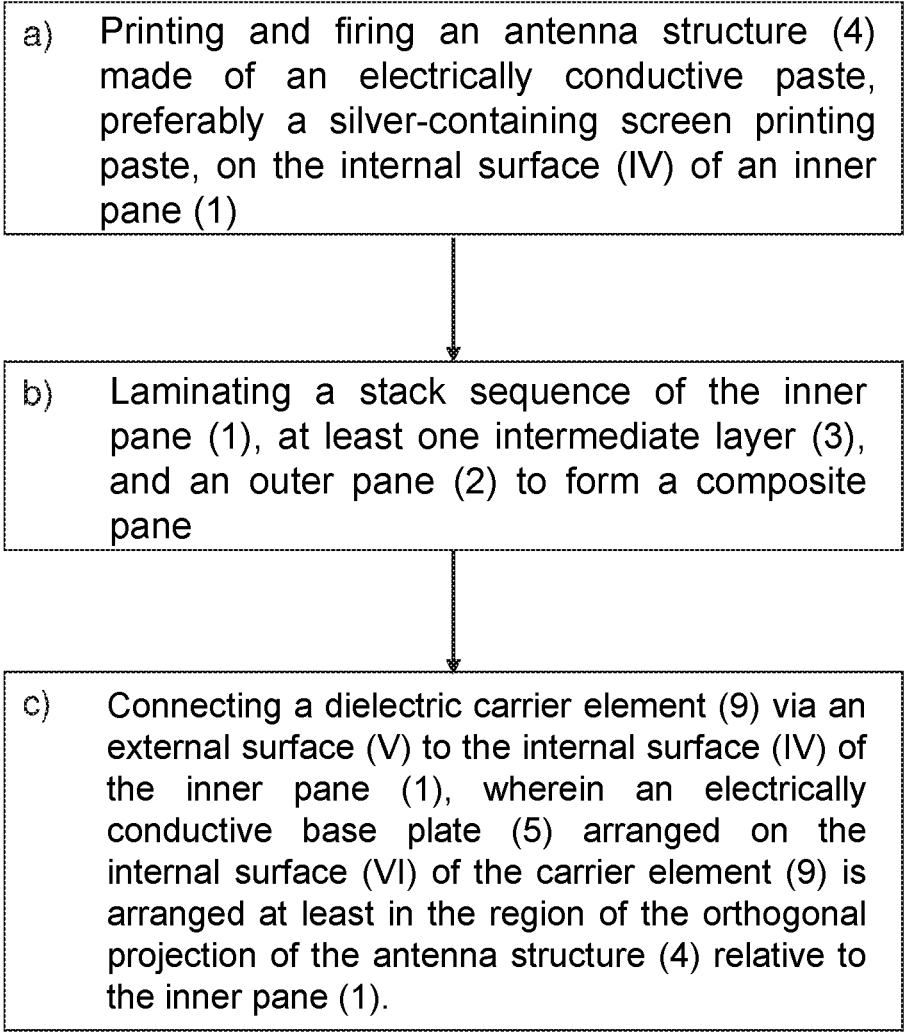
FIG. 6B depicts a flowchart of an exemplary embodiment of the method according to the invention for producing an antenna composite pane 101 according to the invention.

In summary, the present invention consists in providing an improved antenna pane in which an antenna and, in particular, a GNSS antenna can be integrated easily and economically. This result was unexpected and surprising for the person skilled in the art.

LIST OF REFERENCE CHARACTERS 1 inner pane
2 outer pane
3 intermediate layer
4 antenna structure
5 base plate
6 slot-shaped cutout
7 triangular cutout
8 rectangular cutout
9 carrier element
10 coplanar strip conductor, strip conductor, foil conductor
11 signal line
12 shield
13 electrical line connection
14 connection element
15 inner conductor
16 electrical insulation
20 capacitive coupling region
21 gluing spot
22 through-passage
30, 31 pane edge
32 blockout print
33 communication window
34 side edge of the carrier element 9
40 satellite
41 emission zone of the satellite 40
50 interior
51 exterior
100 antenna pane
101 antenna composite pane
A area of the orthogonal projection of the antenna structure 4
$a_D$ leg length of the triangular cutout 7
$b_A$ width of the antenna structure 4
$b_G$ width of the base plate 5
$b_S$ width of the slot-shaped cutout 6
$d_9$ thickness of the carrier element 9
$\varepsilon_{r,1/2}$ relative permittivity of the inner pane 1 or the outer pane 2
$\varepsilon_{r,3}$ relative permittivity of the intermediate layer 3
$l_A$ length of the antenna structure 4
$l_G$ length of the base plate 5
$l_S$ length of the slot-shaped cutout 6
A-A' section line
B-B' section line
C-C' section line
Z detail
I external surface of the outer pane 2
II internal surface of the outer pane 2
III external surface of the inner pane 1
IV internal surface of the inner pane 1
V external surface of the carrier element 9
VI internal surface of the carrier element 9

The invention claimed is:
1. An antenna pane, comprising:
an inner pane having an internal surface,
an antenna structure made of an electrically conductive paste that is printed and fired on the internal surface of the inner pane,
a dielectric carrier element that is connected to the internal surface of the inner pane via an external surface of the dielectric carrier element, the dielectric carrier element having an electrically conductive base plate on an internal surface of the dielectric carrier element, wherein the electrically conductive base plate is arranged at least in a region of an orthogonal projection of the antenna structure relative to the inner pane, wherein the antenna structure is connected electrically conductively to a signal line of a coplanar strip conductor, wherein the coplanar strip conductor is guided around a side edge of the dielectric carrier element and on the internal surface of the dielectric carrier element, and wherein a shield of the coplanar strip conductor is electrically connected to the base plate.

2. The antenna pane according to claim 1, wherein the electrically conductive base plate contains one of:
a printed, electrically conductive paste, and
an electrically conductive foil.

3. The antenna pane according to claim 2,
wherein the electrically conductive base plate contains a silver-containing screen printing paste, and
wherein the electrically conductive foil is a metal foil.

4. The antenna pane according to claim 3, wherein the metal foil is one of: a) a copper foil, b) a silver foil, c) a gold foil, and d) an aluminum foil.

5. The antenna pane according to claim 2, wherein the electrically conductive foil has a thickness of 50 μm to 1000 μm, and a conductivity of $1*10^6$ S/m to $10*10^7$ S/m.

6. The antenna pane according to claim 5, wherein the conductivity is from $3.5*10^7$ S/m to $6.5*10^7$ S/m.

7. The antenna pane according to claim 1, wherein the printed and fired electrically conductive paste has a thickness of 3 μm to 20 μm and a sheet resistance of 0.001 ohm/square to 0.03 ohm/square.

8. The antenna pane according to claim 7, wherein the sheet resistance is from 0.002 ohm/square to 0.018 ohm/square.

9. The antenna pane according to claim 1, wherein the antenna structure is galvanically connected to the signal line of the coplanar strip conductor.

10. The antenna pane according to claim 1, wherein the shield of the coplanar strip conductor is galvanically connected to the base plate.

11. The antenna pane according to claim 1, wherein at least one of the signal line and the shield are arranged on a carrier film.

12. The antenna pane according to claim 11, wherein the carrier film contains polyimide or polyethylene terephthalate (PET).

13. The antenna pane according to claim 12, wherein the carrier film has a relative permittivity of 2 to 4.

14. The antenna pane according to claim 13, wherein the relative permittivity is from 2.7 to 3.3.

15. The antenna pane according to claim 1, wherein the signal line, the electrically conductive base plate, and the shield are implemented in one piece.

16. The antenna pane according to claim 1, wherein the electrically conductive base plate is arranged on a carrier film.

17. The antenna pane according to claim 16, wherein the carrier film contains polyimide or polyethylene terephthalate (PET).

18. The antenna pane according to claim 16, wherein the carrier film has a relative permittivity of 2 to 4.

19. The antenna pane according to claim 18, wherein the relative permittivity is from 2.7 to 3.3.

20. The antenna pane according to claim 1, wherein the dielectric carrier element is a plastic plate.

21. The antenna pane according to claim 20, wherein the plastic plate is a mounting plate of a cover.

22. The antenna pane according to claim 20, wherein the plastic plate comprises at least one of: a) polycarbonate, b) acrylonitrile butadiene styrene copolymer (ABS), c) polyethylene (PE), d) polypropylene (PP), e) polyvinyl chloride (PVC), f) polystyrene (PS), g) polybutylene terephthalate (PBT), h) polyamide, and i) polyethylene terephthalate (PET).

23. The antenna pane according to claim 1, wherein a plane of the electrically conductive base plate has a grounding region and a capacitive coupling region configured to provide capacitive coupling or decoupling of an antenna signal.

24. An antenna composite pane comprising the antenna pane according to claim 1, wherein an external surface of the inner pane is bonded via an intermediate layer to an internal surface of an outer pane.

25. The antenna composite pane according to claim 24, wherein at least one of the inner pane and the outer pane contains glass or polymers, having a relative permittivity $\varepsilon_{r,1/4}$ of 2 to 8.

26. The antenna composite pane according to claim 25, wherein the relative permittivity $\varepsilon_{r,1/4}$ is from 6 to 8.

27. The antenna composite pane according to claim 25,
wherein the glass comprises one of: a) flat glass, b) float glass, c) quartz glass, d) borosilicate glass, e) soda lime glass, and
wherein the polymers comprise one or more of: f) polyethylene, g) polypropylene, h) polycarbonate, and i) polymethylmethacrylate.

28. An antenna pane arrangement comprising:
the antenna composite pane according to claim 24,
receiving or transmitting electronics that are electrically coupled to the antenna structure and the electrically conductive base plate,
wherein the antenna composite pane is arranged as glazing in a vehicle body.

29. An antenna pane arrangement comprising:
the antenna pane according to claim 1, and
receiving or transmitting electronics that are electrically coupled to the antenna structure and the electrically conductive base plate,
wherein the antenna pane is arranged as glazing in a vehicle body.

30. A method, comprising using of the antenna pane according to claim 1 in at least one of: a) means of transportation for travel on land, in the air, or on water, b) furniture, and c) buildings,
wherein the means of transportation comprises motor vehicles, and
wherein using of the antenna pane comprises using as one of: i) a windshield, ii) a rear window, iii) a side window, and iv) a roof panel.

31. A method, comprising using of the antenna pane according to claim 1 for reception of signals for satellite-supported navigation,
wherein the signals comprise one or more of: a) a right circularly polarized GPS signal with an L1 frequency of 1575.42 MHz, and b) a GLONASS signal with a frequency of 1602 MHz±4 Mhz.

32. A method for producing an antenna pane, the method comprising:
providing an inner pane having an internal surface,
providing an electrically conductive paste,
printing and firing the electrically conductive paste on the internal surface, thereby forming an antenna structure, connecting a dielectric carrier element to the internal surface of the inner pane via an external surface of the dielectric carrier element, wherein an electrically conductive base plate arranged on an internal surface of the dielectric carrier element is arranged at least in a region of an orthogonal projection of the antenna structure relative to the inner pane, wherein the antenna structure is connected electrically conductively to a signal line of a coplanar strip conductor, wherein the coplanar strip conductor is guided around a side edge of the dielectric carrier element and on the internal surface of the dielectric carrier element, and wherein a shield of the coplanar strip conductor is electrically connected to the base plate.

33. The method for producing an antenna pane according to claim 32, wherein the electrically conductive paste comprises a silver-containing screen printing paste.

34. The method for producing an antenna pane according to claim 32, wherein the dielectric carrier element is bonded to the inner pane by gluing with an adhesive.

* * * * *